Patented June 2, 1931

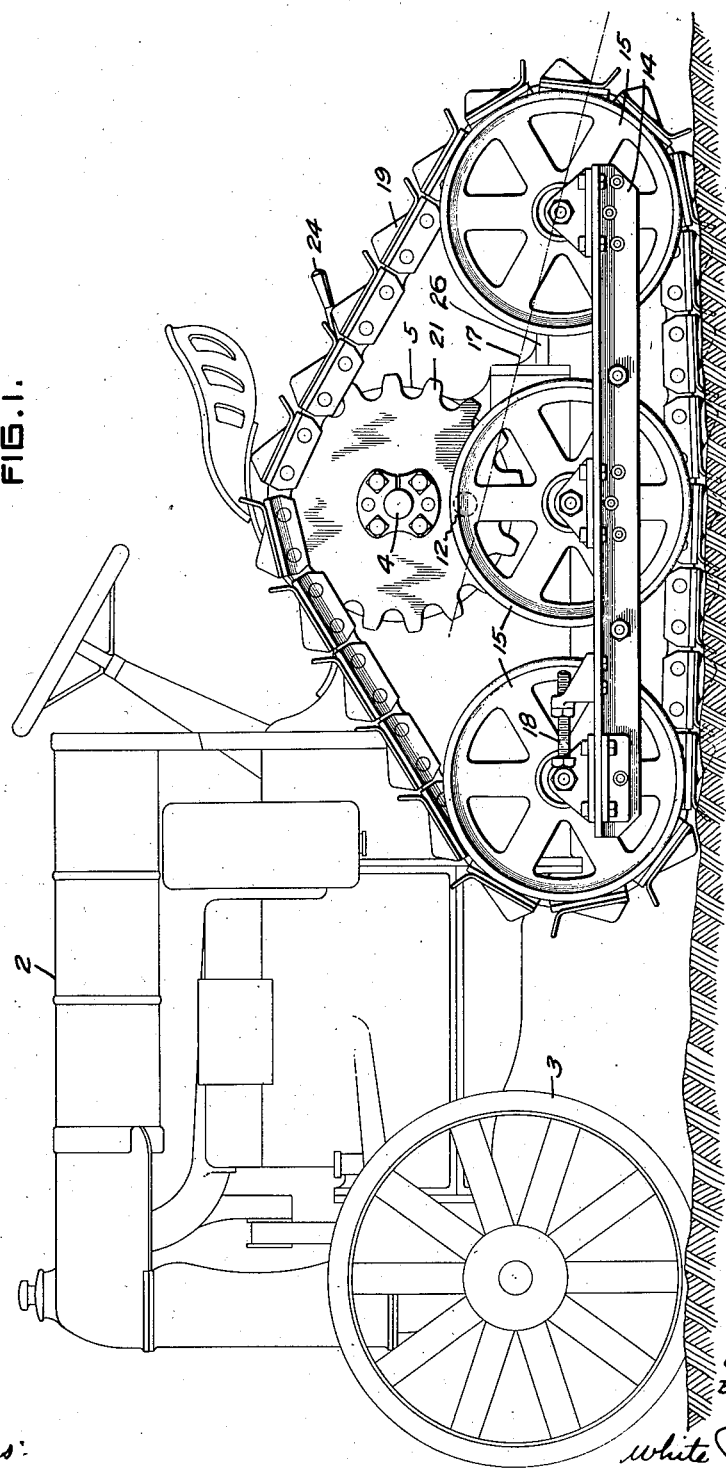

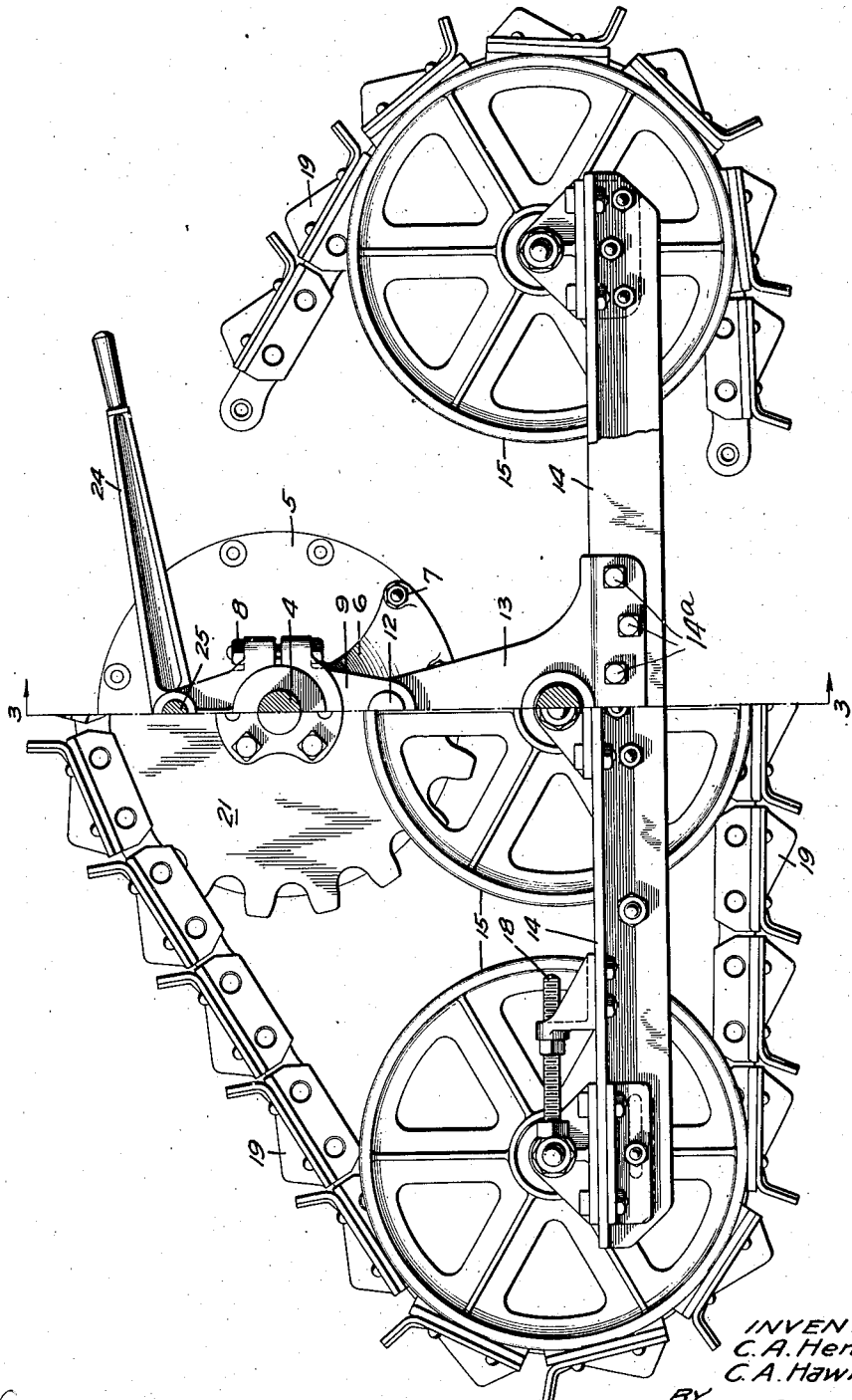

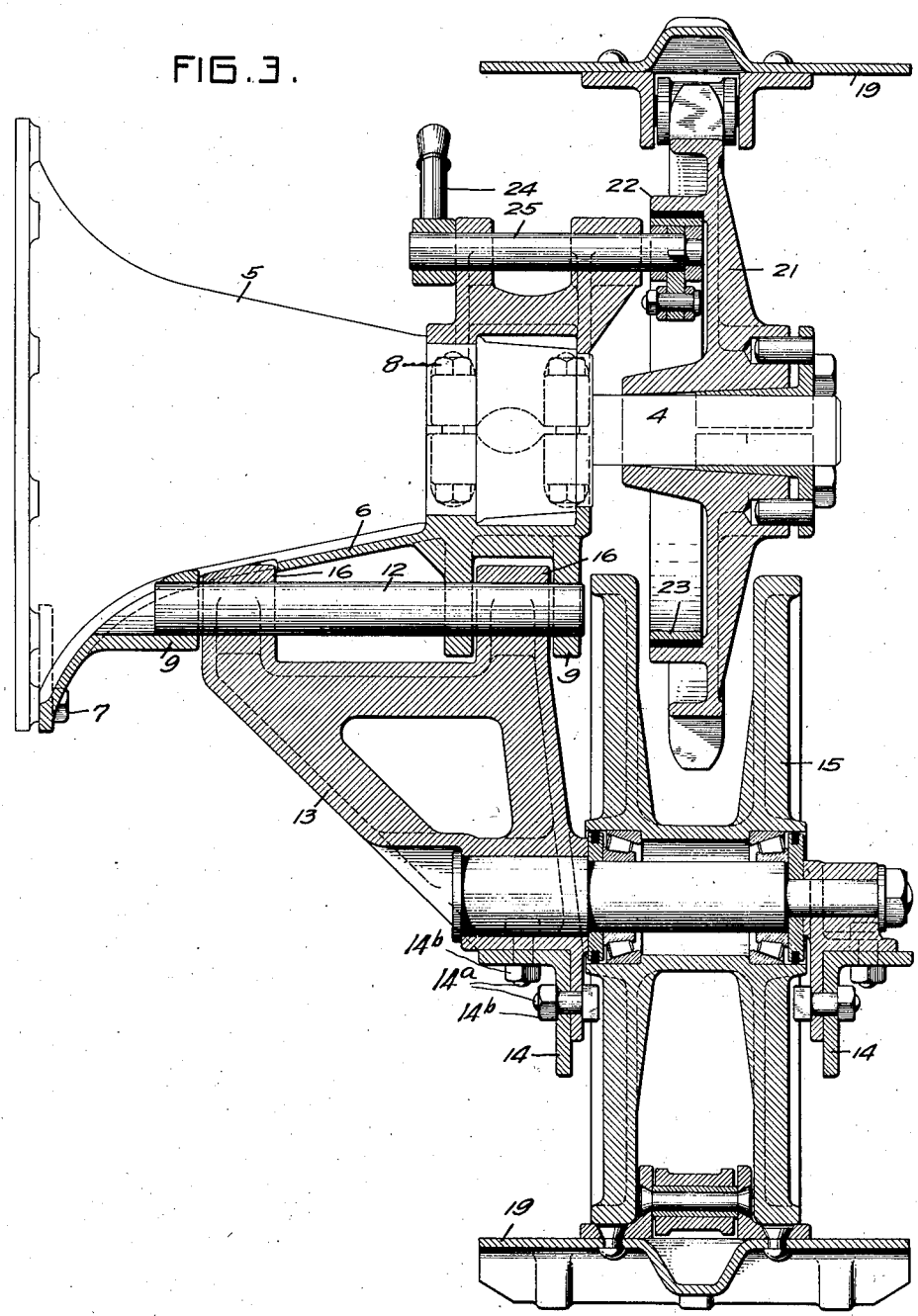

1,808,735

UNITED STATES PATENT OFFICE

CLARENCE A. HENNEUSE, OF SACRAMENTO, AND CHARLES A. HAWKINS, OF SAN FRANCISCO, CALIFORNIA, ASSIGNORS, BY MESNE ASSIGNMENTS, TO W. A. RIDDELL COMPANY, OF BUCYRUS, OHIO, A CORPORATION OF OHIO

TRACTOR

Application filed December 1, 1923. Serial No. 677,962.

The invention relates to tractors or motor vehicles of the crawler type and particularly to an apparatus for converting a wheel tractor or motor vehicle into one of the crawler type, although the invention is not limited to the conversion apparatus.

An object of the invention is to provide a crawler type tractor in which, during operation of the tractor, the front wheels will maintain a substantially even pressure on the ground at all times, regardless of the load being pulled by the tractor.

Another object of the invention is to provide a crawler type unit adapted to replace the rear wheels of a Fordson or other wheel type of tractor.

Another object of the invention is to provide means for attaching a crawler type track to a tractor so that the resultant force due to the driving of the tractor tends to bring the ground pivoting point of the track to the rear of the track thereby exerting a tendency to hold the front end of the tractor down.

The invention possesses other advantageous features, some of which, with the foregoing, will be set forth at length in the following description, where we shall outline in full, that form of our invention which we have selected for illustration in the drawings accompanying and forming part of the present specification. In said drawings we have shown one form of tractor embodying our invention, but it is to be understood that we do not limit ourselves to such form, since the invention, as set forth in the claims, may be embodied in a plurality of forms.

Referring to said drawings:

Figure 1 is a side elevation of a Fordson tractor equipped with the crawler type track of our invention.

Figure 2 is a side elevation of the track, parts thereof being broken away to disclose the structure behind the track.

Figure 3 is a vertical section taken on the line 3—3, Figure 2.

One particular type of wheel tractor, the Fordson tractor, has gone into very extensive use and one of the objects of this invention is to provide mechanism for readily converting the Fordson tractor into a crawler tractor. In accordance with our invention we retain the drive employed in the Fordson and have applied the mechanism of our invention thereto, thus not only reducing the cost of the conversion, but also utilizing the existing drive to accomplish turning the crawler tractor in a very short radius.

A desirable feature of crawler tractors is the provision of means whereby the crawler structure on each side of the tractor may oscillate to a limited degree in the vertical plane, with respect to the tractor frame and with respect to the other crawler structure, so that when moving over irregular ground, the crawler track may oscillate independently to conform to the irregularities, maintaining traction and preventing the introduction of undue strain into the tractor frame. The attachment or conversion structure of our invention is arranged to provide these advantageous features.

In the operation of tractors, it has been found that the pressure of the front or steering wheels on the ground decreases with an increasing load on the tractor. In some instances this effect has been so pronounced that the front wheels of the tractor have been lifted from the ground. In these conditions it is very difficult and sometimes impossible to steer the tractor and the structure of our invention is arranged, so that under any drawbar load, the front wheels of the tractor will maintain a substantially even pressure on the ground at all times, thereby greatly facilitating the operation of the tractor. Conversely, if in the operation of the tractor the pressure on the front end is greatly increased when pulling a load, so that steering is difficult, the structure of our invention may be arranged to reduce the pressure of the front wheels and thus facilitate steering.

In the specific form of tractor attachment of our invention shown in the accompanying drawings, the flexible track has a substantially horizontal lower run, and an upwardly and downwardly inclined upper run, the driving sprocket being arranged above the idlers or rollers under which the flexible track passes so that the track inclines upwardly from the end rollers to the driving sprocket. The driving sprocket pulls upwardly on the downwardly inclined rear portion of the upper run of the track, producing a resultant line of force which bisects the angle formed by the downwardly inclined rear portion of the upper run of the track and the horizontal portion of the track. It is to be understood however, that the invention is not limited to this type of track having an upwardly and downwardly inclined upper run, but is applicable to other types of track with equal efficiency. We have found that the pressure of the front wheels of the tractor on the ground depends upon the relation of the pivot pins on which the track structures are mounted and the resultant line of force. By placing the pivot pin above the resultant line of force the action of the driving sprocket tends to bring the ground pivoting point of the flexible track to the rear and tends to hold the front end of the tractor down. By selecting the proper relation of the pivot point to the line of resultant force, the front wheels will maintain a substantially even pressure on the ground at all times, regardless of the draw-bar load. If the front end of the tractor is normally too heavy, the arrangement of the pivot pin below the resultant force line will reduce the weight on the front wheels, when the tractor is in operation. In applying the structure of our invention to a Fordson tractor, we arrange the pivot pin above the line of resultant force so that the front end of the tractor, is held against the ground with a substantially even pressure, regardless of the drawbar pull.

The Fordson tractor 2 is provided with front steering wheels 3 and with a driving axle 4 which is enclosed in the axle housing 5. The axle housing 5 is secured by suitable bolts to the differential housing. Our attachment comprises a bracket 6 which is secured to the axle housing 5 at its inner end by the bolts 7 and which surrounds and is clamped to the outer end of the axle housing by the bolt 8. The bracket 6 is provided with a plurality of spaced bearings 9 for the pivot pin 12 which in the specific construction shown preferably lies directly below the drive axle 4 and in the vertical plane of the axis of the drive axle. Mounted on the pivot pin 12 is a bracket 13 which is secured at its lower end to the frame 14 by bolts 14a and nuts 14b upon which the idlers 15 are mounted. The bracket 13 is provided with spaced bearing members 16 which engage the pin 12 at spaced points, adjacent the bearing members 9, so that the load of the tractor is well distributed over the length of the pin so that the twisting strains exerted on the pin will have no deleterious effect. The bracket 13 is secured to the frame 14 at its center and the frame is thus pivotally mounted on the pin 12 and is free to oscillate to a limited extent on the pin. The pin 12 lies below the axis of the drive axle 4 and lies above the plane of the centers of the idler wheels 15 mounted on the frame. In Figure 1 we have indicated by the broken line 17, the resultant line of force of the track and the pin 12 is disposed above the point at which the line of force intercepts the vertical plane through the axis of the driving shaft 4. By this arrangement variation in draw-bar load will not affect materially the pressure of the front wheels on the ground. The three idler wheels 15 are mounted on the frame 14 and are spaced apart longitudinally of the frame to produce a long flat ground contacting area of track. The front idler wheel bearing is adjustable longitudinally of the frame by the jack screws 18 so that the tightness of the flexible track 19 may be suitably adjusted.

Secured to the drive axle 4 by any suitable means is a driving sprocket 21 over which the flexible track passes. The flexible track passes from the front idler 15 upwardly to the sprocket 21, passes over the sprocket and then passes downwardly under the rear idler 15. The line of force due to the pull of the sprocket lies in the plane of the downwardly inclined track portion, lying between the sprocket 21 and the rear idler wheel. The line of force due to the resistance of the lower run of the track lies in the plane of the ground and the resultant line of force bisects the angle formed by the power and resistance lines. The relative position of the pivot pin 12 with respect to the resultant line of force, determines the condition of ground pressure which will exist at the forward end of the tractor.

The construction of our invention is such that the resultant force due to the combined tractor pull and draw-bar load tends to bring the ground pivoting point of the track to the rear of the track, thereby exerting a tendency to hold the front end of the tractor down. As the draw-bar load increases, the ground pivoting point moves back, so that a greater weight of tractor is disposed in front of the ground pivoting point to compensate for the increased draw-bar pull. The draw-bar or draft link is connected to the body or frame of the tractor at a suitable point and in the type of tractor shown in the drawings is connected to the extension 26.

The driving sprocket 21 is provided with an internal annular shoulder 22 adjacent which there is disposed a brake band 23 which is moved into engagement with the shoulder by the lever 24 which is secured to the operating shaft 25 journalled in the outer portion of the bracket 6.

It is understood that in converting a wheel tractor to a crawler type tractor that the drive wheels of the tractor are removed and the driving sprockets are secured to the drive axle. With the use of the conversion unit of our invention, the drive axle remains at the same distance above the ground as it did in the wheel tractor.

We claim:

1. The combination with a tractor having a driving axle and a non-revoluble housing enclosing said axle, of an endless flexible track connected to said axle, rollers on which said track is mounted, a frame on which said rollers are mounted, a pivot pin carried by said housing and spaced from said axle and a bracket secured to said frame and mounted on said pivot pin.

2. The combination with a tractor having front wheels and a driving axle, a sprocket on said axle, an endless flexible track passing over said sprocket, rollers under which the track passes, said rollers being below said sprocket whereby the upper run of the track inclines upwardly from the rollers to the sprocket, a frame on which said rollers are mounted and a pivot carried by the tractor on which said frame is mounted, said pivot being fixedly disposed below the driving axle and above the resultant line of force of the pull on the track.

3. The combination with a tractor having a driving axle and a housing enclosing said axle, of a bracket detachably secured to said housing, a pivot pin carried by said bracket directly below said axle, a driving sprocket on said axle, an endless flexible track engaging said sprocket, rollers under which said track passes, a frame on which said rollers are mounted and a bracket secured to said frame and engaging said pivot.

4. The combination with a tractor having a driving axle and a housing enclosing said axle, of a bracket secured to said housing, a horizontally disposed pivot pin fixedly carried by said bracket below and in the vertical plane of the axis of said axle, an endless flexible track driven by said axle, longitudinally spaced rollers under which the track passes, a frame on which said rollers are mounted, a bracket secured to said frame at the center thereof and mounted on said pivot pin at spaced points thereon.

5. The combination with a tractor having a driving axle and a housing enclosing said axle, of a bracket secured to said housing, a pivot pin carried by said bracket below and in the vertical plane of the axis of the axle, a a driving sprocket secured to said axle, an endless flexible track passing over the driving sprocket, three spaced rollers under which the track passes, the centers of said rollers being below the driving axle, a frame on which said rollers are mounted and a bracket secured to the frame and carrying the axle of the central roller mounted on said pivot pin, said pin being disposed above the centers of said rollers.

6. The combination with a tractor having a driving axle and a housing enclosing said axle, of a bracket secured to said housing at its inner and outer ends, a pivot pin supported in said bracket at its ends and disposed directly below the axle, a bracket engaging said pin at spaced points, a frame secured to said bracket, rollers mounted on said frame, a sprocket on said driving axle and an endless flexible track passing over the sprocket and under the rollers.

7. The combination with a tractor having a driving axle and a housing enclosing said axle, of a sprocket on said driving axle, an endless flexible track driven directly by said sprocket, a frame on which said track is mounted, a detachable bracket on said housing, a bracket on said frame and a pivot pin connecting said brackets and carrying the weight of the tractor.

8. In combination with a tractor of the wheeled type having a rear driving axle enclosed by a housing, a driving sprocket on said axle, a bracket adapted to surround the outer end of said housing and be detachably clamped thereto, and a track unit eccentrically mounted on said bracket and adapted to be driven by said sprocket.

9. In combination with a tractor of the wheeled type having a rear driving axle enclosed by a housing, a driving sprocket on said axle, a bracket detachably secured to said housing at points near the outer and inner ends thereof, and a track unit eccentrically mounted on said bracket at spaced points thereon and adapted to be driven by said sprocket.

In testimony whereof, we have hereunto set our hands.

CLARENCE A. HENNEUSE.
CHARLES A. HAWKINS.